US008566801B2

(12) United States Patent
Shah et al.

(10) Patent No.: US 8,566,801 B2
(45) Date of Patent: Oct. 22, 2013

(54) CONCURRENT STATIC SINGLE ASSIGNMENT FOR GENERAL BARRIER SYNCHRONIZED PARALLEL PROGRAMS

(75) Inventors: Harshit J. Shah, Mumbai (IN); Rudrapatna Kallikote Shyamasundar, Mumbai (IN); Pradeep Varma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 12/470,577

(22) Filed: May 22, 2009

(65) Prior Publication Data

US 2010/0299656 A1 Nov. 25, 2010

(51) Int. Cl.
*G06F 9/44* (2006.01)
*G06F 9/45* (2006.01)

(52) U.S. Cl.
USPC ............ 717/132; 717/114; 717/124; 717/131; 717/133; 717/155

(58) Field of Classification Search
USPC .................. 717/132, 114, 124, 131, 133, 155
See application file for complete search history.

(56) References Cited

U.S. PATENT DOCUMENTS

| | | | | |
|---|---|---|---|---|
| 6,102,968 | A * | 8/2000 | Colby et al. ................ | 717/126 |
| 6,817,013 | B2 * | 11/2004 | Tabata et al. ................ | 717/151 |
| 8,255,911 | B2 * | 8/2012 | Sakai ........................... | 718/102 |
| 2002/0162097 | A1 * | 10/2002 | Meribout ..................... | 717/155 |
| 2005/0053090 | A1 * | 3/2005 | Harada et al. ............... | 370/464 |
| 2005/0108696 | A1 * | 5/2005 | Dai et al. ..................... | 717/151 |
| 2005/0138397 | A1 * | 6/2005 | Kusudo et al. .............. | 713/188 |
| 2007/0089097 | A1 * | 4/2007 | Hu et al. ...................... | 717/132 |
| 2008/0114842 | A1 * | 5/2008 | Ellis et al. ................... | 709/206 |
| 2008/0301655 | A1 * | 12/2008 | Gulwani et al. ............. | 717/156 |

OTHER PUBLICATIONS

Agarwal et al., "May-happen-in-parallel analysis of ×10 programs", In PPoPP '07: Proceedings of the 12th ACM SIGPLAN symposium on Principles and practice of parallel programming, pp. 183-193, NY, 2007.

Brandis et al., "Single-pass generation of static single-assignment form for structured languages", ACM Trans. Program. Lang. Syst., 16(6):1684-1698, 1994.

Briggs et al., "Effective partial redundancy elimination", In PLDI '94: Proceedings of the ACM SIGPLAN 1994 conference on Programming language design and implementation, pp. 159-170, NY 1994.

Cytron et al., "Efficiently computing static single assignment form and the control dependence graph", ACM Trans. Program. Lang. Syst., 13(4):451-490, 1991.

(Continued)

*Primary Examiner* — Idriss N Alrobaye
*Assistant Examiner* — Getente A Yimer
(74) *Attorney, Agent, or Firm* — Ryan, Mason & Lewis, LLP

(57) ABSTRACT

Techniques for generating concurrent static single assignment (CSSA) are provided. The techniques include generating a clocked control flow graph of a program, for each thread of the program created through async instruction, determining each part of the program that can execute concurrently with each thread to create a pair comprising a thread and a parallel program part, for each pair that can execute concurrently, using one or more flow equations to perform node-by-node matching, and using the node-by-node matching to generate CSSA form for the program.

18 Claims, 14 Drawing Sheets

(56) References Cited

OTHER PUBLICATIONS

Ferrante et al., "The program dependence graph and its use in optimization", ACM Trans. Program. Lang. Syst., 9(3):319-349, 1987.

C. T. P. C. Forum. Pcf parallel fortran extensions. SIGPLAN Fortran Forum, 10(3):1-57, 1991.

Grundwald et al., "Data flow equations for explicitly parallel programs", In PPOPP '93: Proceedings of the fourth ACM SIGPLAN symposium on Principles and practice of parallel programming, pp. 159-168, New York, NY, USA, 1993. ACM.

Kamil et al., "Yelick. Concurrency analysis for parallel programs with textually aligned barriers", In In Proceedings of the 18th International Workshop on Languages and Compilers for Parallel Computing, pp. 185-199, 2005.

Kennedy et al., "Partial redundancy elimination in SSA form", ACM Trans. Program. Lang. Syst., 21(3):627-676, 1999.

J. Knoop, "Eliminating partially dead code in explicitly parallel programs", Theor. Comput. Sci., 196(1-2):365-393, 1998.

Knoop et al., "Parallelism for free: effcient and optimal bitvector analyses for parallel programs", ACM Trans. Program. Lang. Syst., 18(3):268-299, 1996.

Lee et al., "Concurrent static single assignment form and constant propagation for explicitly parallel programs", in LCPC '97: Proceedings of the 10th International Workshop on Languages and Compilers for Parallel Computing, pp. 114-130, London, UK, 1997. Springer-Verlag.

Lee et al., "Basic compiler algorithms for parallel programs", SIGPLAN Not., 34(8):1-12, 1999.

Naumovich et al., "An efficient algorithm for computing mhp information for concurrent java programs", In ESEC/FSE-7: Proceedings of the 7th European software engineering conference held jointly with the 7th ACM SIGSOFT international symposium on Foundations of software engineering, pp. 338-354, London, UK, 1999. Springer-Verlag.

Novillo et al., "Concurrent SSA form in the presence of mutual exclusion", In ICPP '98: Proceedings of the 1998 International Conference on Parallel Processing, p. 356, Washington, DC, USA, 1998. IEEE Computer Society.

Rosen et al., "Global value numbers and redundant computations", In POPL '88: Proceedings of the 15th ACM SIGPLAN-SIGACT symposium on Principles of programming languages, pp. 12-27, New York, NY, USA, 1988. ACM.

Sarkar et al., "Parallel program graphs and their classification", In Proceedings of the 6th International Workshop on Languages and Compilers for Parallel Computing, pp. 633-655, London, UK, 1994. Springer-Verlag.

Shasha et al., "Efficient and correct execution of parellel programs that share memory", ACM Trans. Program. Lang. Syst., 10(2):282-312, 1988.

Srinivasan et al., "Static single assignment for explicitly parallel programs", In POPL '93: Proceedings of the 20th ACM SIGPLAN-SIGACT symposium on Principles of programming languages, pp. 260-272, New York, NY, USA, 1993. ACM.

Wegman et al.. "Constant propagation with conditional branches", ACM Trans. Program. Lang. Syst., 13(2)181-210, 1991.

* cited by examiner

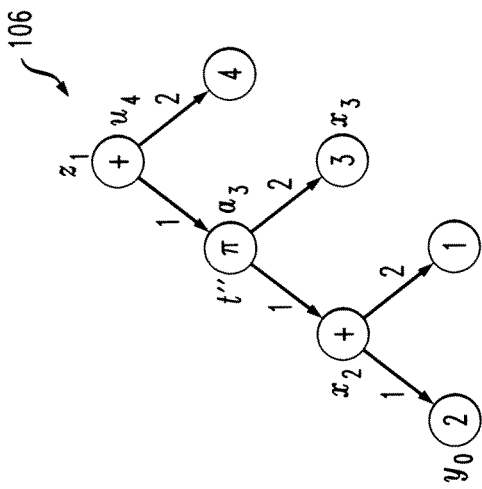
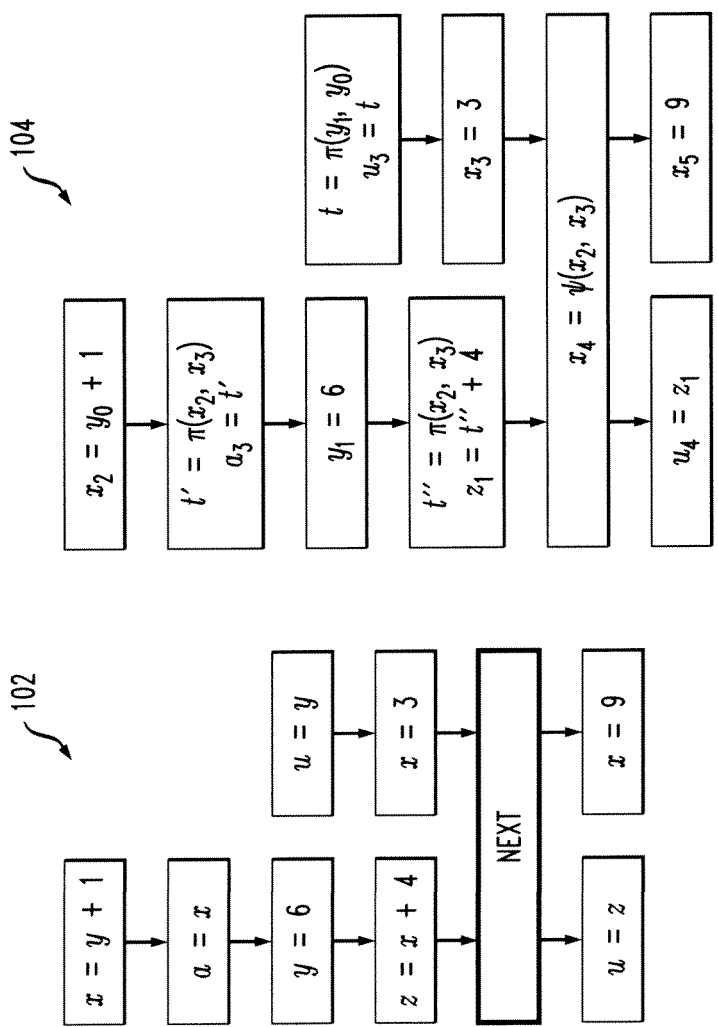
FIG. 1

FIG. 3

ALGORITHM 1 COMPUTE SET OF CONCURRENTLY EXECUTABLE PARTS

Require: set $Async$ of async edge targets
Ensure: $\forall\, b \in Async$.a set $Async(b)$ that points to parts that can execute concurrently with $b$ 1: for all $b \in Async$ do
2:    $Async(b) = Async$
3:    for all $x \in Async(b)$ such that there is a path from $x$ to $b$ do
4:      $Async(b) = Async(b)/\{x\}$
5:      if $\exists\, y : ((Parent(x).y) \in E) \land (async \notin etype((Parent(x), y)) \land (y \neq finish\_end \land y \neq t.exit)$ then
6:        $Async(b) = \{y\} \cup Async(b)$
7:      end if
8:    end for
9:    for all $x$ such that $x = finish\_end \land x \in ancestor(b)$ do
10:      $Z = \{z | z \in Async(b) \land (id(x) \in F_z)\}$
11:      $Async(b) = Async(b)/Z$
12:    end for
13:    if $F_b \neq \emptyset$ then
14:      for all $n \in F_b$ do
15:        let $x \in N$ such that $x = finish\_end \land id(x) = n$
16:        let $Y = \{y | y \in Async(b) \land y \in descendant(x)\}$
17:        $Async(b) = Async(b)/Y$
18:      end for
19:    end if
20:    for all $x \in Async(b)$ do
21:      for all $\varphi \in Condition(b)$ do
22:        if $\neg\, \varphi \in Condition(x)$ then
23:          $Async(b) = Async(b)/\{x\}$
24:        end if
25:      end for
26:    end for
27: end for

FIG. 4

ALGORITHM 2 MHP ANALYSIS FOR NODES WITHIN CONCURRENTLY EXECUTABLE PARTS OF PROGRAM

1: for all $b \in Async$ do
2:   for all $x \in Async(b)$ do
3:     let $s$ be the closest common ancestor of $b$ and $x$
4:     let $G_1$ and $G_2$ be the graphs for $b$ and $x$ respectively
5:     since $s$ is the starting node in both the graphs, we call it $s$ in $G_1$ and $s'$ in $G_2$
6:     for all $y \in G_1$ do
7:       $Parallel(y) = \emptyset$
8:       $In(y) = \emptyset$
9:       $Next(y) = \emptyset$
10:     end for
11:     $In(s) = \{s'\}$
12:     let $work\_list = <s>$
13:     while $work\_list \neq \emptyset$ do
14:       remove a node $y$ from $work\_list$
15:       if $y! = s$ then
16:         $temp == IN(y)$
17:       else
18:         $temp = \emptyset$
19:       end if
20:       compute $IN(y)$ from predecessors if any
21:       if $IN(y) == temp$ then
22:         continue
23:       end if
24:       compute $Parallel(y)$ from $In(y)$
25:       compute $Next(y)$ from $Parallel(y)$
26:       add all nodes for which $y$ is immediate ancestor to $work\_list$
27:     end while
28:   end for
29: end for

PHASE(x) = {⟨i,j⟩ | i ≥ 2 and j = 2,3,4}

CONCURRENT STATIC SINGLE ASSIGNMENT FOR GENERAL BARRIER SYNCHRONIZED PARALLEL PROGRAMS

FIELD OF THE INVENTION

Embodiments of the invention generally relate to information technology, and, more particularly, to concurrent static single assignment (CSSA) form.

BACKGROUND OF THE INVENTION

Static single assignment (SSA) form enables many compiler optimizations to be done efficiently. This form is an intermediate representation in which variable redefinition is replaced by variable re-naming. Thus, no variable is ever re-defined. When a variable is defined along more that one mutually exclusive path, a $\phi$ assignment for that variable is placed in the join node. Thus, in concurrent static single assignment (CSSA) form, the use-def chain reduces to a singleton set (as exactly one definition can reach any use in the program).

Concurrent SSA (CSSA) is the SSA form for parallel programs. With CSSA, in addition to $\phi$ assignments, parallel programs have $\psi$ and $\pi$ assignments. A $\psi$ assignment is used at the cobegin/coend barrier node among concurrently implementing threads to merge the interleaved definitions of shared variables occurring in different threads. A $\pi$ assignment is used to sample (that is, define) the value of a shared variable before its actual use if a definition of that variable, in a concurrently implementing thread, can reach the use.

Most existing approaches on CSSA form are targeted towards languages with implicit barriers like cobegin/coend and parallel do and synchronization primitives like wait/signal. Some have also considered parallel languages with mutual-exclusion primitives like locks. Synchronization barriers are not limited as in the languages that have been considered so far, which present a challenge in generating CSSA form for such general-barrier languages.

SUMMARY OF THE INVENTION

Principles and embodiments of the invention provide techniques for concurrent static single assignment (CSSA) for general barrier synchronized parallel programs.

An exemplary method (which may be computer-implemented) for generating concurrent static single assignment (CSSA), according to one aspect of the invention, can include steps of generating a clocked control flow graph of a program, for each thread of the program created through async instruction, determining each part of the program that can execute concurrently with each thread to create a pair comprising a thread and a parallel program part, for each pair that can execute concurrently, using one or more flow equations to perform node-by-node matching, and using the node-by-node matching to generate CSSA form for the program.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating concurrent static single assignment (CSSA) form and a global value numbering (GVN) technique, according to an embodiment of the invention;

FIG. 3 is a diagram illustrating an algorithm for computing a set of concurrently executable parts, according to an embodiment of the invention;

FIG. 4 is a diagram illustrating an algorithm for May-Happen-in-Parallel (MHP) analysis for nodes within concurrently executable parts of a program, according to an embodiment of the invention;

DETAILED DESCRIPTION OF EMBODIMENTS

Figure 2:
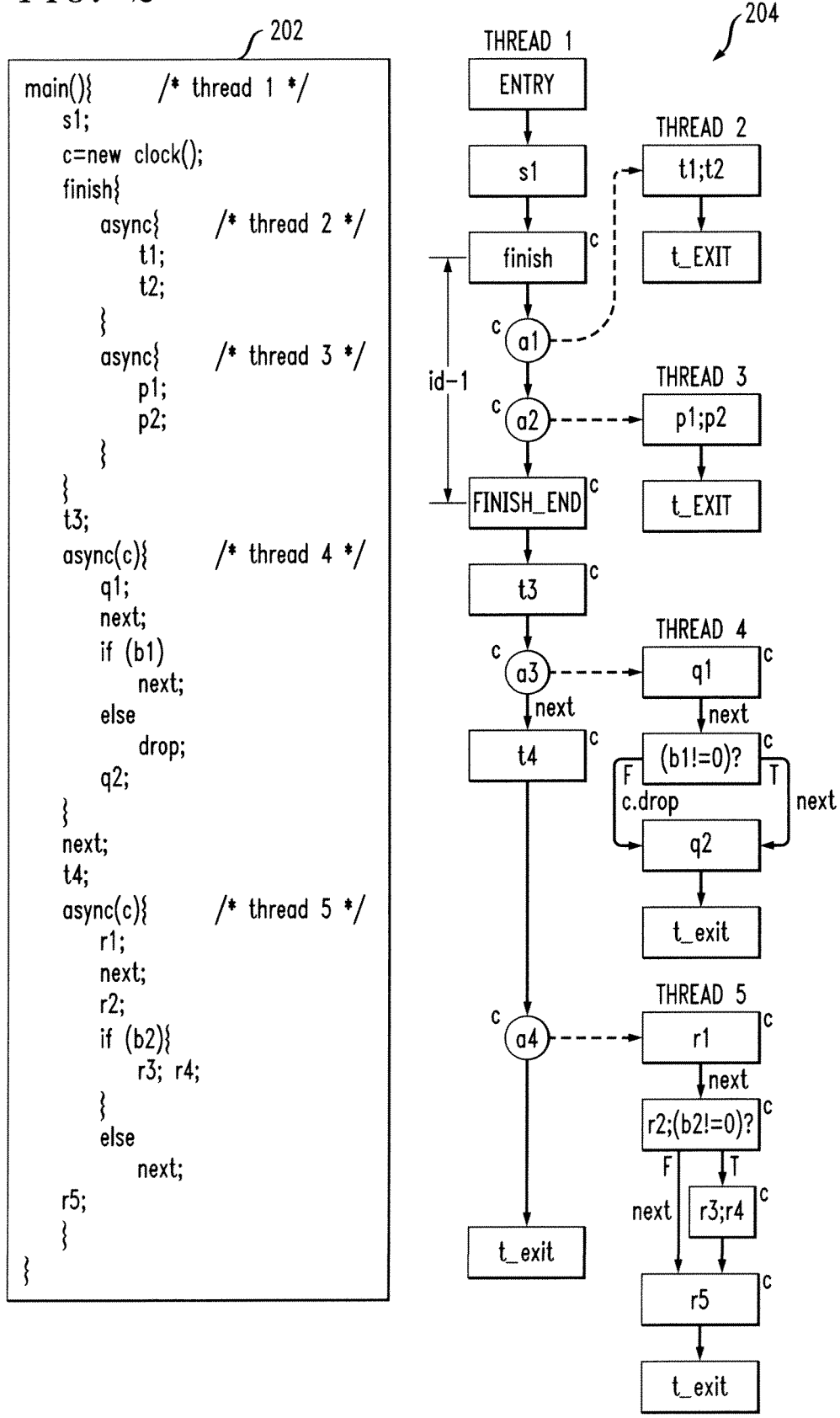
FIG. 2 is a diagram illustrating a sample program and its clocked control flow graph (CFG), according to an embodiment of the invention.

Principles of the invention include concurrent static single assignment (CSSA) for general barrier synchronized parallel programs. One or more embodiments of the invention include computing improved CSSA form of a program by taking advantage of general barriers present therein. Additionally, the techniques detailed herein include presenting a control flow graph abstraction and a dataflow analysis framework for general barrier operations within the program (using clock operations and finish), and computing improved CSSA representation of a program by accounting for the general barriers (clocks, finish) within the program. One or more embodiments of the invention can also include computing May-Happen-in-Parallel (MHP) analysis for the programs containing general barriers or clock/finish operations within them.

The efficiency of analysis and optimizations for parallel programs depends on the number and complexity of pi assignments in their CSSA representations. The techniques described herein include computing CSSA form for languages supporting general barrier synchronization and improving the precision of intermediate representation for computing global value numbering and optimizations such as partial redundancy elimination, common sub-expression elimination and loop invariant detection.

One or more embodiments of the invention use a language fragment (including barrier synchronization features such as, for example, asynchronous threads, finish and clocks), as well as the classical sequential fragment. A refined CSSA can be obtained by abstracting the program through a clocked control graph and doing a May-Happen-in-Parallel (MHP) analysis using flow equations. The techniques detailed herein obtain a refined and more precise CSSA form compared to disadvantageous existing approaches that are blind to general barrier manipulation (for example, clock operations and finish statements).

One or more embodiments of the invention include general barrier synchronization (GBS) language such as, for example, a kernel language GBS that includes X10 features such as threads async, barrier synchronization constructs finish, clocks, etc. Additionally, such a GBS has mutual exclusion (atomic) over the sequential constructs, Seq. Seq is minimally described through sequencing (;), conditionals, and for a loop. The abstract syntax of GBS is given below.

```
S      ::= Seq | async [clocked (c)] S | S | clock | atomic (Seq)
clock  ::= C=new clock( ) | next | C.drop( )
Seq    ::= X:= Exp | S;S | if E then S else S | for (i = min ..max) do S
```

In the exemplary kernel language described herein, Exp denotes expressions. Also, async S creates a parallel thread for evaluating statement S. async clocked (c) S creates a parallel thread registered to the clocks in the list c. A thread can either be registered to a clock set or unregistered at a time. By being registered to a clock set, the thread participates in barrier operations over different thread partitions described in terms of clocks (later).

finish S implements S with a surrounding barrier that ensures all threads (recursively) created by S terminate before finish S concludes. Also, a clock is created by the new clock( ) expression. The thread creating a clock is automatically registered to the clock. Further, there are only two ways of registering a thread to a clock: one by clock creation, and the other by listing the clock at the time of the async creation statement. At creation time, a child thread can be registered to only a subset of the parent thread's registered clocks.

Clock operations can include a barrier statement (next), and/or deregistration (drop). Deregistration vis-à-vis a clock can be carried out any time, and in particular, can be carried out just before a thread terminates (so that the remaining threads over the clock can indulge in barriers without waiting over an inactive thread). Note that by the definition of clock registration, once deregistration has been carried out, the clock cannot be re-registered to the same thread.

A next statement implemented by a clocked thread indicates that the thread has entered a barrier operation shared by other clocked threads. This thread will wait for other threads registered to its own clocks to enter a next operation each before progressing past the next barrier. Because the other clocked threads may be registered to different clock sets, all threads registered to the (recursive) union of clock sets have to enter the barrier before any thread can exit the same.

Additionally, atomic S implements statement S in isolation from the rest of the program either fully, or not at all. Thus, this provides the software transactional memory (STM) style of mutual exclusion, for example, in X10 programs.

As described herein, one or more embodiments of the invention include generating CSSA form. Initially, note the role of MHP analysis in arriving at the CSSA through the program shown in FIG. 1. FIG. 1 is a diagram illustrating concurrent static single assignment (CSSA) form and a GVN technique, according to an embodiment of the invention.

By way of illustration, FIG. 1 depicts flow 102, flow 104 and flow 106. 102 is a control flow representation of the program. 104 is the CSSA form generated by one or more embodiments of the invention. 106 is the value graph generated by a global value numbering (GVN) technique when run on the CSSA form 104. Also, 106 illustrates how the techniques described herein helps GVN deduce that $a3=3$ and $z1=u4=7$, thereby improving its precision. As depicted in FIG. 1, two threads are executing in parallel and synchronizing through a next instruction (represented by "next" block in FIG. 1).

The use of x at $z=x+4$ in the first thread can depend only on the previous definition $x=y+1$ in the same thread or the definition $x=3$ in the other thread. It does not depend on the definition $x=9$ in the second thread, as this definition occurs after the barrier. Given that the initial value of y is 2 (that is, $y0=2$), FIG. 1 illustrates how a global value numbering algorithm can determine $a3=3$ and $z1=u4=7$ because $x2=x3=3$. This could not have been possible if one would have ignored the synchronization effected by clocks through a "next" statement and considered all possible inter-leavings. Thus, taking the synchronization constructs into consideration while generating CSSA for parallel programs improves efficiency and precision of optimizations.

One or more embodiments of the invention additionally use alternate techniques to generate CSSA. A GBS program can be abstracted as a clocked control flow graph (Clocked CFG). Additionally, one can determine what fragments of the program can run in parallel with each other. For each pair of concurrently executable fragments, one can also determine the statements in one fragment that can implement in parallel with statements in the other using MHP analysis.

As described herein, in one or more embodiments of the invention, CSSA form can be generated using a clocked CFG of a program, and for each thread created through async instruction, one can determine other parts of the program that can implement concurrently with it. Also, for each pair of parts that can implement in parallel, one can use flow equations to match nodes (instructions) of the two parts and generate CSSA form for the program.

For a clocked CFG of a program, $G=(N,E)$ is a representation similar to a concurrent control flow graph but it also captures synchronization relevant information like clock commands (creation and drop), next command and finish constructs. The graph can be constructed as follows.

Initially, nodes of G for a given program are defined as follows:

an "entry" node marking the beginning of the program (it dominates all nodes in the Clocked CFG);

an "exit" node that post-dominates all the nodes in the Clocked CFG; and a node representing a sequence of instructions such that control can enter only through the first and leave only through the last statement. This can be denoted by a rectangular box. The drop and clock c=new Clock( ) statements can only appear at the beginning, and there can be at most one shared variable access in the node.

Also, for each "async" statement, one can create one node in the current thread (denoted by a circle) and the set of nodes corresponding to its body along with a new node "t exit" to denote the end of the body. Note that this node post-dominates all the nodes between the corresponding "async" node and itself, and one can treat the first node of the body itself as the starting node rather than add a new starting node. For illustration, see FIG. 2. Additionally, a "finish" node represents beginning of a finish{ } block, and a "finish end" node represents the end of a finish{ } block.

The initial edge set E can be constructed as follows. One can add an edge between n1 and n2 if there is an edge in the corresponding control flow graph, and from each "async" node, one can add a dotted edge to the first node of its body as well as add an edge from the last node of its body to the corresponding "t_exit." Also, one can add an edge to the next node in the thread where the "async" textually appears.

From a denotation as described herein, a node may include more than one statement. The graph G can also be refined as follows. If a node denotes a statement sequence including two consecutive next statements, one can add a dummy node between every consecutive next statement, and one can repeat the step until there are no consecutive next statements.

Also, one can split each node at the point where next statement occurs and insert a "next" edge at that point between the two parts. Further, a similar procedure can be followed for statements of the form c_i.drop( ) (however, dummy nodes need not be added for consecutive c_i.drop( ) and c_j.drop( ) statements).

Clocked CFG is a graph <N,E>, where, N is the set of nodes and E is the set of (directed) edges (that is, E ⊂ N×N). Let C={c1, c2, . . . , ck} be the set of clocks used in the program. The type of edges is given by etype: E→ $2^{\{next,\ async,\ c1.drop,\ \ldots,\ ck.drop\}}$. An edge <x, y>∈E, such that async ∈ etype (<x, y>) indicates that x is an "async" node (point where async instruction appears in the program). Labels for nodes are given by the function label: N→$2^C$. The label indicates the set of clocks with which the node could be registered.

FIG. 2 is a diagram illustrating a sample program 202 and its clocked CFG 204, according to an embodiment of the invention. 204 represents clocked CFG for the program in 202 where all async edges (that is, async ∈ etype(e)) are represented by dashed lines. Edges marked "next" are the next edges (that is, next ∈ etype(e)). Similarly, edges marked "c.drop( )" for some clock c are drop edges (that is, c.drop ∈ etype(e)). It is possible that an edge e could be such that etype(e)={async, next} or etype(e)={async, c.drop( )}. An edge u, with etype(u)=∅ is not marked in 204. Labels for all the nodes that have labels are also shown. Labeling of nodes can be done without sacrificing correctness of analysis. In 204, node q2 in thread 4 does not have a label because clock c is dropped along one path to q2. Thus, a node x can be labeled ci only if all nodes along all paths from the beginning of the thread to x have label ci or ci is created by a node that dominates x and is not dropped along any path to x.

Each finish{ } block is given a unique identifier (ID) and for each node x∈N such that x=finish or x=finish_end, id(x) returns the ID of its finish block. For each node x∈N that is start node of a thread (that is, it has an async edge pointing to it and for some y∈N, async ∈ etype(<y, x>)), the set Fx contains the ids of finish{ } blocks that enclose x. In element 204 of FIG. 2, there is only one finish{ } block which has ID 1. Hence, F<p1;p2>=F<t1;t2>={1} and every other node x, Fx=∅. For each "async" node b that lies within the scope of conditional statements, one can record the conditions (as formulae) that lead to its implementation in the set Condition (b). Thus, if ϕ is the condition leading to an async in the "if" part of conditional statement, the condition leading to the else part would be ¬ ϕ. For "async" a node b that does not lie within scope of any conditionals, now set Condition(b)=True (denoting that the condition of implementation is always "true").

As described herein, one or more embodiments of the invention include abstracting concurrent implementation among "async" threads. FIG. 3 is a diagram illustrating an algorithm 302 for computing a set of concurrently executable parts, according to an embodiment of the invention. For each thread created through async command, one may want to know the parts of program it can run in parallel with. Such a thread is represented by the node which is pointed to by "async" edge from the respective "async" node. For example, threads 2, 3, 4 and 5 in 204 of FIG. 2 are represented by nodes <t1;t2>, <p1;p2>, q1 and r1, respectively. Let Async be the set of all such nodes that have an async edge pointing to them. For each node b∈Async, FIG. 3 computes Async(b), which is the set of other parts that may implement in parallel with b.

Guiding principles for the technique depicted in FIG. 3 are described below. For example, when a thread creates a new thread through an async statement, the new thread cannot implement in parallel with the part of the old thread (recursively in case of nested asyncs) that occurs before async statement. The new thread can run in parallel with part of the old thread that occurs after async statement. Also, a thread created after a finish{ } block cannot implement in parallel with any thread created inside the block. Further, threads created along mutually exclusive control flow paths cannot implement in parallel.

For each node b∈Async, one can remove from Async(b) nodes representing threads in which the current thread is nested. For each node thus removed, one can add a node representing the part of thread after the async instruction if it is not the end of "finish" block or the end of thread (for example, lines 2-8 in FIG. 3). For example, in element 204 of FIG. 2, thread 4 cannot implement with the node s1 at the beginning of main thread (thread 1), but it can implement in parallel with the part of main thread after node a3. Hence, one can add t4 to Async(q1).

For each node b∈Async, any thread created in a "finish" block that precedes b cannot implement in parallel with b. Lines 9-19 of FIG. 3 enforce this requirement. For example, in element 204 of FIG. 2, thread 4 represented by node q1 appears after the "finish" block. Hence, nodes <t1;t2> and <p1;p2> are removed from Async(q1) (and vice versa). Lines 20-26 of FIG. 3 ensure that threads created along mutually exclusive paths in the program are not considered for MHP analysis. Additionally, in element 204 of FIG. 2, Async={<t1; t2>, <p1; p2>, q1, r1}, Async(<p1; p2>)={<t1; t2>}, Async (q1)={r1, t4} and Async(r1)={q1}.

As detailed herein, one or more embodiments of the invention include May-Happen-in-Parallel (MHP) analysis for clocked CFG. For each node b in Async, the nodes in set Async(b) represent parts of the program that can implement in parallel with b. Let x∈Async(b). One can perform MHP analysis on the parts pointed to by b and x. For every node in one part, the MHP analysis determines the nodes in other parts that can run in parallel with it (this is referred to as the step matching of nodes). The closest common ancestor of nodes b and x is a common ancestor (including b and x) such that it is closest to both b and x. The closest common ancestor of the two parts represents a branching point and a pivot with respect to which the analysis is done. Thus, MHP analysis can include computing the closest common ancestor z of b and x, creating two graphs G1 and G2 starting from the common node z, and matching G1 and G2.

FIG. 4 is a diagram illustrating an algorithm 402 for MHP analysis for nodes within concurrently executable parts of a program, according to an embodiment of the invention. FIG. 4 depicts how the MHP analysis is done. Once one computes the closest common ancestor s for b and x, one can generate two graphs G1 and G2 for b and x respectively.

In G1, one can consider all paths from s to b and from b to the end of its thread, and graph G2 for x is generated in a similar way. The node s forms the start node for both G1 and G2 and is added to both with different names (for example, s and s'). For example, in element 204 of FIG. 2, node a3 is the closest common ancestor for threads 4 and 5 represented by nodes q1 and r1, respectively.

Figure 5:
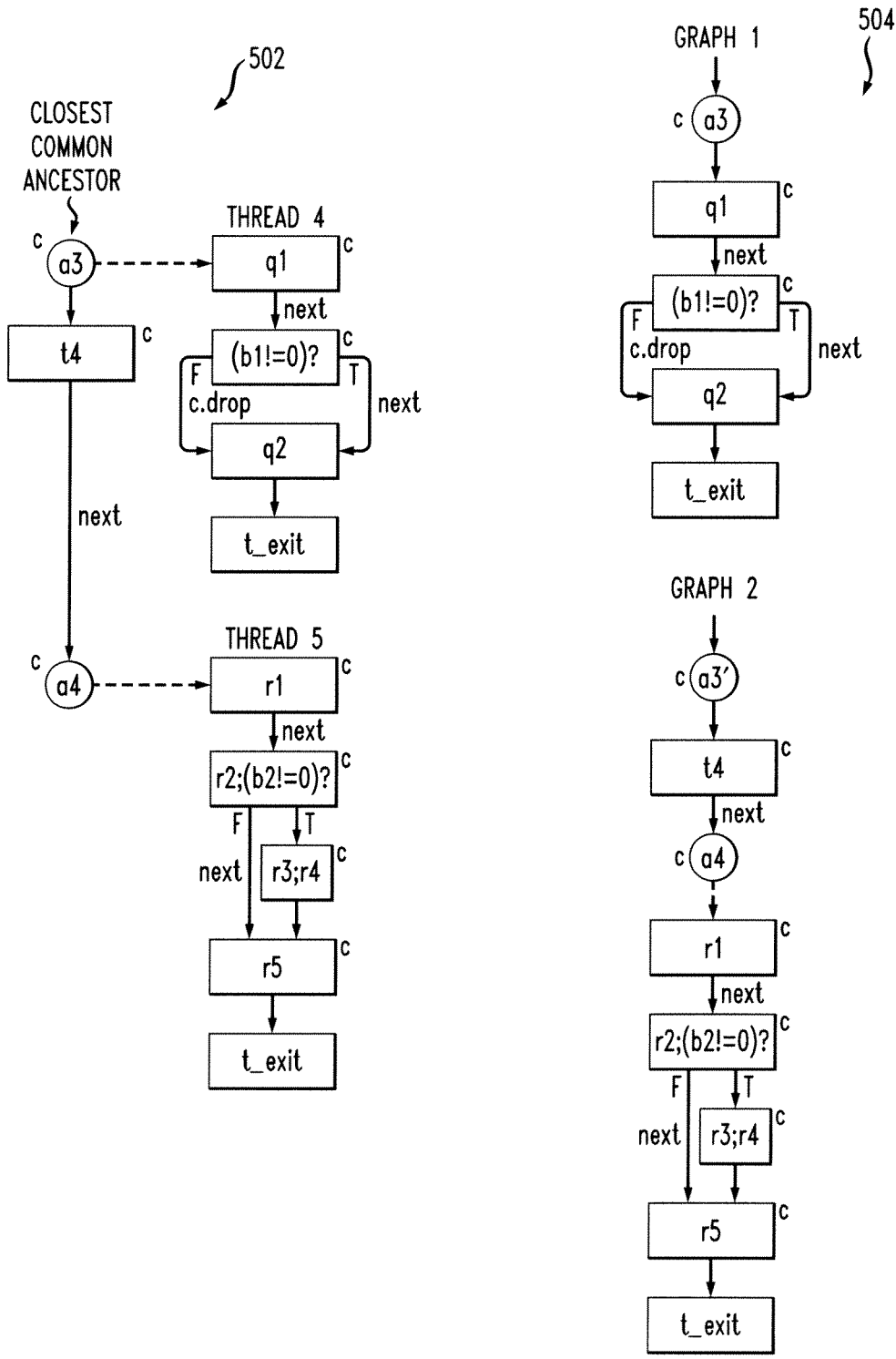
FIG. 5 is a diagram illustrating a matching of threads, according to an embodiment of the invention.

FIG. 5 is a diagram illustrating a matching of threads, according to an embodiment of the invention. By way of illustration, FIG. 5 depicts a common ancestor (a3) 502 and generated graphs 504. Element 502 shows the part one can consider for matching thread 4 and thread 5, and element 504 shows the two graphs generated.

After obtaining the two graphs, one can use flow equations to match nodes in the two graphs. One can chose one graph (for example, G1) and for each node x in that graph, one can compute Parallel(x) which is the set of nodes in the other graph that may possibly implement in parallel with it. Associated with each node x in G1 are the attributes including the sets In(x), Parallel(x), and Next(x). Each of these attributes is initially empty. In(s) is a special case and is initialized to {s'}. After this, the flow computation iterates over the graph G1, with the attribute sets increasing in size monotonically until a fix-point is reached (whereupon the attributes stop changing).

In(x) is obtained from the attributes of each immediate ancestor of x. It is the union of either Parallel(y) or Next(y), where y is an immediate ancestor of x. Next(y) is taken if there is only one edge between y and x and it has a "next" label, otherwise Parallel(y) is taken. In is a seed set from which all nodes reachable in G2 without changing the phase of pertinent clocks in G2 is computed. The pertinent clocks are the clock set associated with x in G1. This yields the Parallel attribute set for node x. Next(x) is defined to be the set of nodes reachable from a node in Parallel(x) by traversing a path of exactly one must-be synchronized "next" edge (and some more for clock drops, as described herein). Once the fix-point is reached, the set of nodes in Next(x)/Parallel(x) is guaranteed to be sequenced with respect to x and cannot implement in parallel with it. By the definition of In, Next(x) is used to seed the Parallel computation of a successor node of x reached by traversing a next edge in G1.

A simple definition of a must-be synchronization next edge is that its predecessor's (or successor's) clock set overlap (non-null intersection) with the clock set of node x in G1. GBS allows shared synchronization through a reflexive, transitive closure of the asyncs' clocks that the clocks of x may be synchronized to. However, this is conservative. For the clocks c that label x, a sequence of clock drops along a path in G2 can make the path's clocks set disjoint from c. The successor node of the last such clock drop is added to Next(x) because each clock drop carries an implicit resume on its dropped clock and with the last resume, the effect of a next is achieved by the sequence of drops.

Beside must-be synchronized "next" edges, Next(x) includes all nodes reachable from Parallel(x) by a drop-terminated path excluding "next" edges such that the clocks label of each such added node is disjoint from the clock labels of x. Note that Parallel(x) nodes continue past the above clock drop sequences. This is because drop is not a blocking operation for the dropping thread. It is only the case that the phase advance of x's clocks tracked by Next(x) is attained by the terminating drop of the sequences above leading to the above-mentioned definition of Next.

Figure 6:
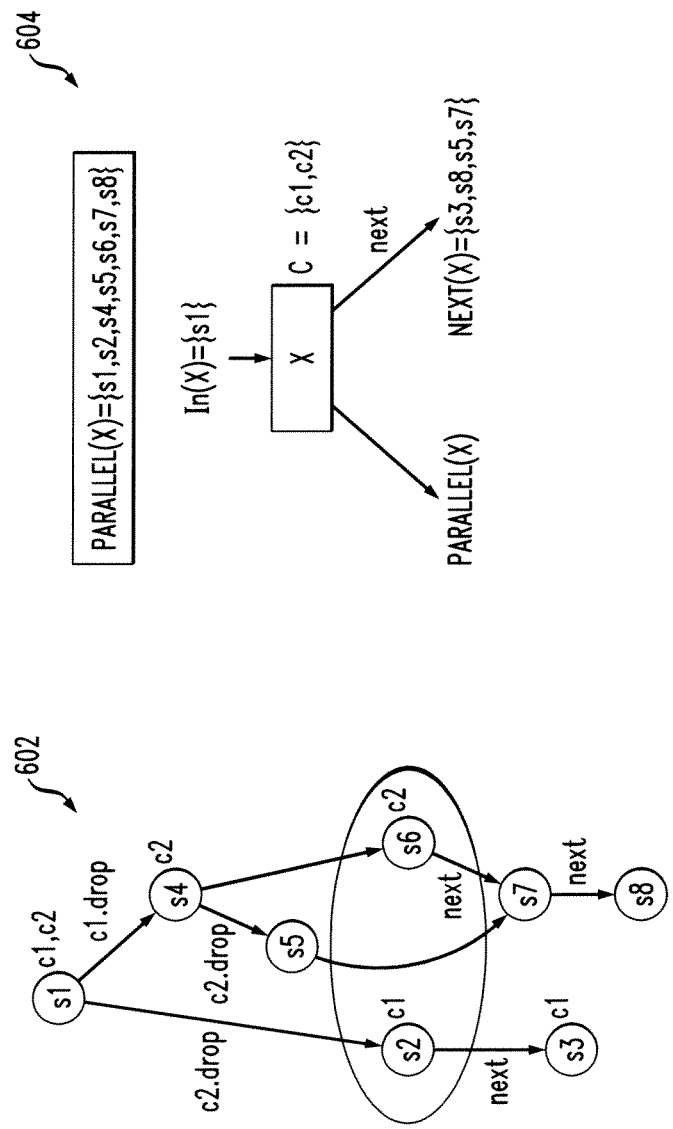
FIG. 6 is a diagram illustrating matching using flow equations, according to an embodiment of the invention.

An example is shown in FIG. 6 where matching of node X in one graph with a part of the other graph is depicted. FIG. 6 is a diagram illustrating matching using flow equations, according to an embodiment of the invention. By way of illustration, FIG. 6 depicts flow 602 and flow 604 that represent two sample graphs. 602 illustrates a part of one graph starting at node s1. 604 illustrates a node X in the other graph. One or more embodiments of the invention compute sets Parallel(X), Next(F) from In(X)={s1}, as detailed in FIG. 4.

Starting from node s1 in one graph, s2, s4, s5, s6, s7 and s8 can be reached by traversing non-next edges or those next edges where the source node does not have a label common with X. As explained above, Parallel(X)={s1, s2, s3, s4, s5, s6, s7, s8}. In Parallel(X), nodes s1, s2, s4 and s6 have a label common with X and they are not included in Next(X), but s3 is added because s2 has a "next" edge pointing to it.

Parallel(y) for all y in graph G2 is computed as Parallel(y)= {x|x ∈G1∧ y∈Parallel(x)}.

The framework described herein in connection with one or more embodiments of the invention can additionally include an extension to handle locks. Locks are used to provide mutual exclusion among concurrently implementing threads. Lock variables are read-only so they bind to fixed locks upon initialization. A locked critical section is constrained to follow X10's syntax for an atomic section, except that a lock variable is also specified. For such locks, critical sections are automatically constrained to be sequential (like atomic). For example, consider program fragment shown below:

```
...
async {
    lock(1){ foo=foo+2; }
}
...
lock(1){ foo--; }
```

In the above code, 1 is the lock variable. The lock statement guarantees that only one thread can update variable foo at a time. Incorporating such locks into a framework of one or more embodiments of the invention can include the following. One can label each node in CCFG with the set of locks that have to be obtained before the node can be implemented. This is directly obtained from the syntactic scope of lock statements. For such a CCFG, once one computes Parallel(x), one can remove all nodes from Parallel(x) that have a common lock label with x.

One or more embodiments of the invention also include deriving CSSA from clocked CFG. After matching nodes among concurrently executable parts, one can generate the CSSA form for the program from the clocked CFG, for example, as described below. One can insert φ assignments, wherein the procedure for inserting φ assignments can be the same, for example, as the one used for sequential programs (as these assignments consider definitions reachable through disjoint control paths within the same thread).

Also, one can insert ψ assignments, wherein ψ assignments are inserted at join nodes (barriers) among concurrently implementing parts. A ψ assignment is placed in the successor node of a "next" edge for a shared variable if there are multiple definitions of the shared variable that may implement in parallel prior to the "next" edge. The last assignment from each thread is taken.

Additionally, one can rename variables. Further, one can insert π assignments. For each node b, whenever a shared variable is used, a π assignment can be added before the use if one of the nodes in Parallel(b) has a definition of that variable.

Figure 7:
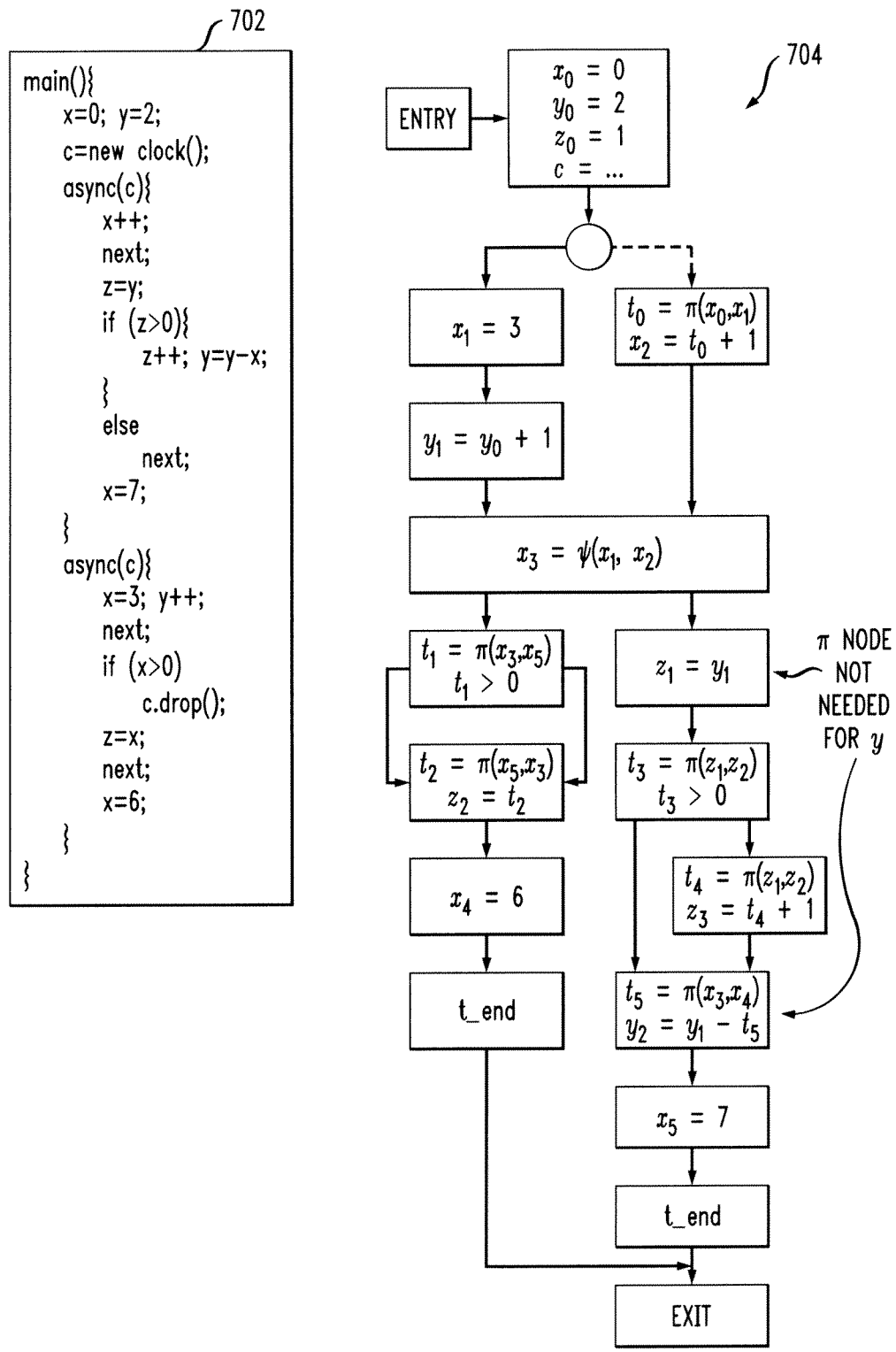
FIG. 7 is a diagram illustrating a CSSA form example, according to an embodiment of the invention.

FIG. 7 is a diagram illustrating a CSSA form example, according to an embodiment of the invention. By way of illustration, FIG. 7 depicts an input program 702 and its CSSA form 704. The thick box represents a barrier node. The figure shows effectiveness of one or more embodiments of the invention in that the two uses of y (indicated by arrows) do not need π functions. Also, the π functions inserted for variable x would each need one more argument if one would not have taken synchronization contructs and clock operations into account.

In matching for the MHP, one can use flow equations to match nodes in two graphs. In order to show that the matching is correct, the concept of phases is introduced. Nodes in the control flow graph have labels. If a node x is labeled ci, then all nodes on all of the paths from the beginning of its thread to x have ci as a label or ci is created by a dominator of x and all the nodes between them have ci as a label. This means that if a node has some label, then that clock is not dropped along any path from beginning of the thread or from the point of creation of the clock to itself.

A phase of a clock indicates the number of nexts that have been implemented by threads registered with that clock. When a clock is created, all threads registered with it are in phase one until they implement next and simultaneously enter the second phase. Every node in a program can be in different phases with respect to different clocks. A node can be in some phase j of some clock ci if it can implement in that phase of the clock.

Figure 8:
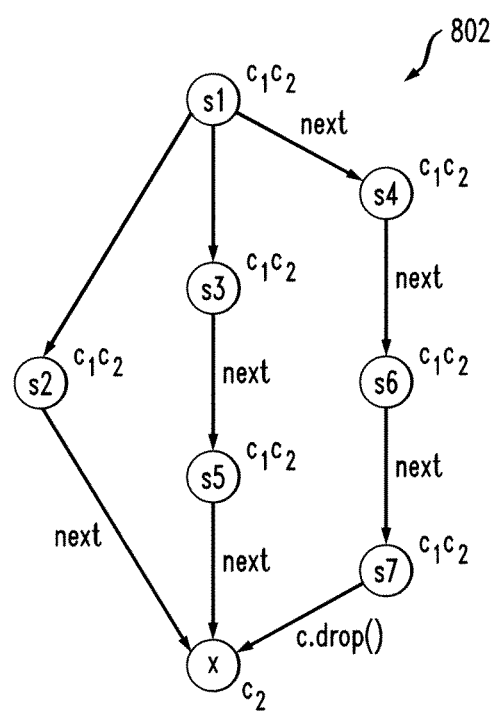
FIG. 8 is a diagram illustrating a phase of node x with respect to clock $c_1$, according to an embodiment of the invention.

Let C={c1, c2, . . . , ck} be the set of clocks used in the program. For a node x in the Clocked CFG, Phase(x) is a set that contains tuples <x1, x2, . . . , xk> such that node x can be in $x_j^{th}$ phase of clock cj. For example, FIG. 8 is a diagram illustrating a phase 802 of node x with respect to clock $c_1$, according to an embodiment of the invention. In FIG. 8, node x could not only be in phase 2, 3 or 4 of clock c1 because of different paths but could also be in any phase greater than 4 because clock is dropped in 4th phase along one path. Because c2 is not dropped along any path, x could be only in phase 2, 3 or 4 of clock c2.

As described herein, one or more embodiments of the invention also include providing an application to compiler optimizations and data races. The concurrent global value numbering (CGVN) technique for CSSA form constructs a value graph for each assignment in the program and partitions the variables. Variables belonging to the same partition have the same value. For example, consider the sample program shown below:

```
main(){
    x=1; y=0; z=2; w=3;
    c=new clock();
    async (c){
        x=6; y=2; z=4;
```

-continued

```
        x=y+2;
        next;
        z=x-1;
    }
    z=3; w=z*3;
    next;
    x=4;
    if (b)
        z=y+1;
    else
        z=y+2;
    w=x+4;
    y=3;
}
```

Figure 9:
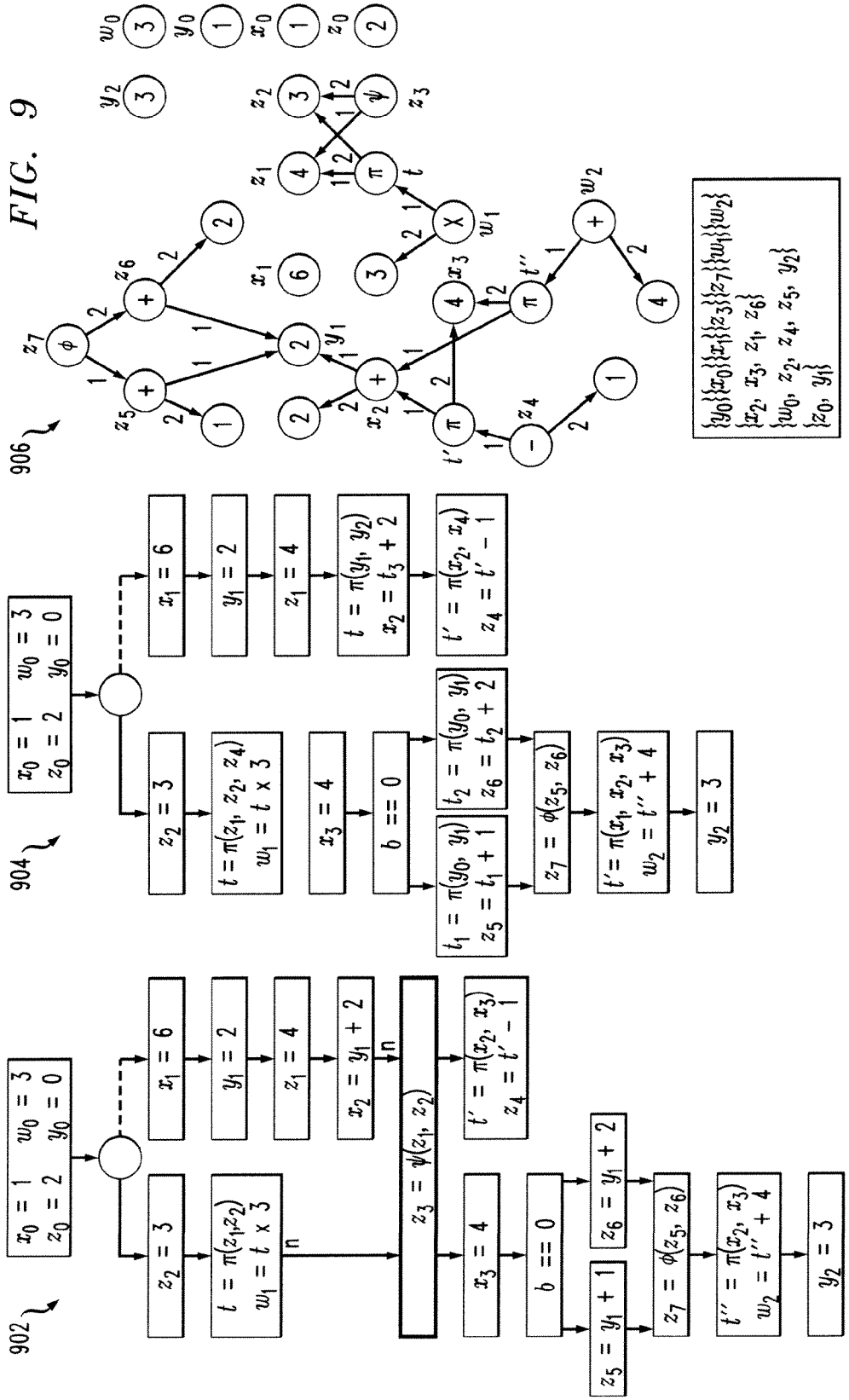
FIG. 9 is a diagram illustrating concurrent global value numbering (CGVN) for a CSSA form, according to an embodiment of the invention.

FIG. 9 is a diagram illustrating concurrent global value numbering (CGVN) for a CSSA form, according to an embodiment of the invention. By way of illustration, FIG. 9 depicts a CSSA form after analysis 902, a CSSA form without analysis 904, and a value graph 906 for the CSSA in 902.

Element 902 illustrates the CSSA form of the program generated from the analysis of one or more embodiments of the invention. The thick box is the synchronization barrier between two threads. Element 904 illustrates the CSSA form generated without considering synchronization among threads. As can be seen from element 902, π assignments are not needed before the definition of variables z5 and z6 and the ones before the definition of w1 and w2 need one argument less.

The value graph for the CSSA form generated using MHP analysis is shown in element 906. The GVN technique concludes that variables x2 and x3 have the same value (that is, 4). This could not have been possible if the CSSA form was generated without considering synchronization among threads.

Loop invariant detection recognizes operations inside a loop that are invariant with respect to loop iterations and can therefore be moved outside the loop. A π assignment can be moved outside the loop if all its arguments are congruent and moving it outside does not violate sequential consistency.

Figure 10:
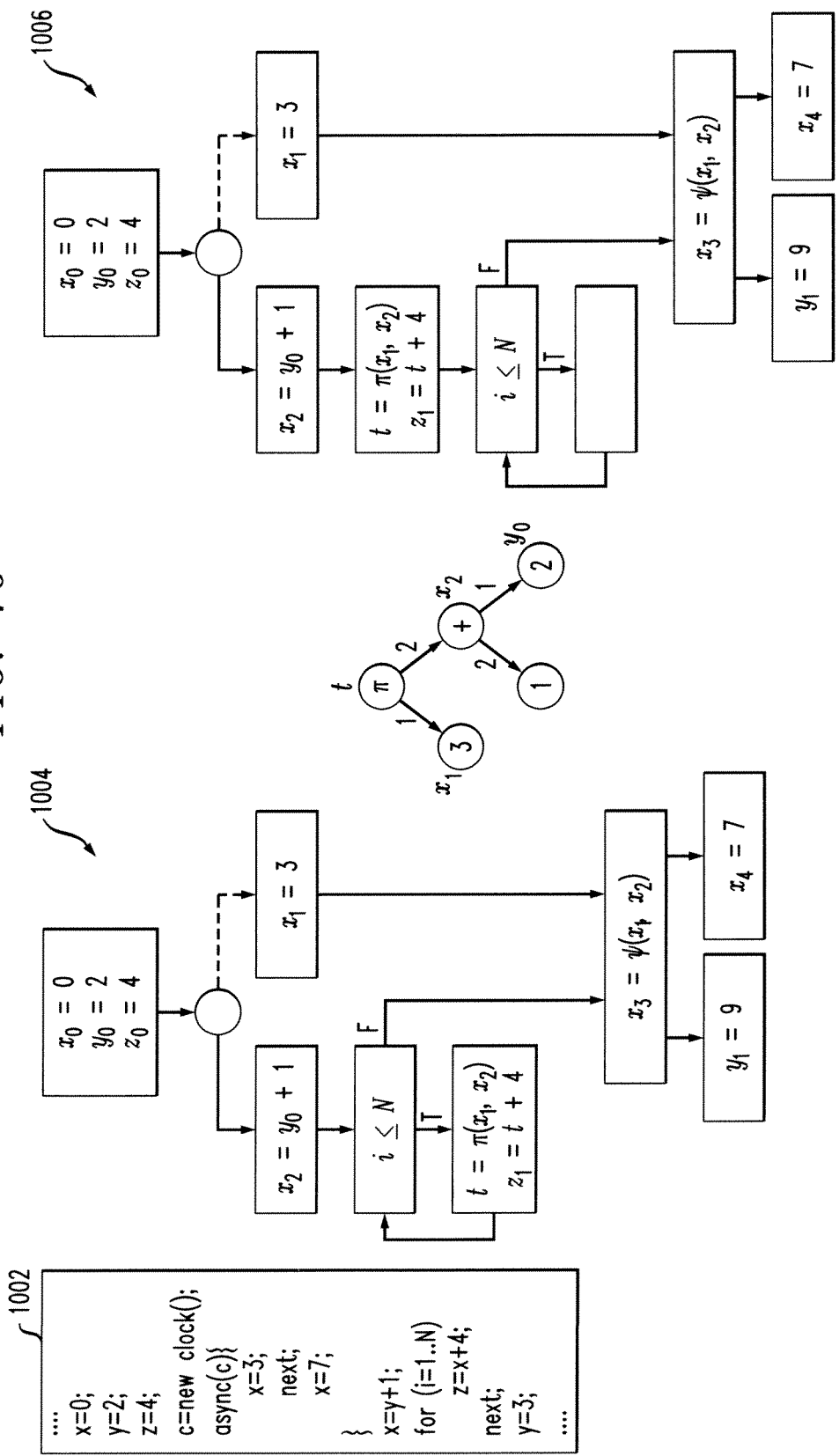
FIG. 10 is a diagram illustrating a loop invariant detection example, according to an embodiment of the invention.

FIG. 10 is a diagram illustrating a loop invariant detection example, according to an embodiment of the invention. By way of illustration, FIG. 10 depicts a program fragment 1002, a CSSA form and GVN 1004 (that is, the CSSA form generated after MHP analysis), and a CSSA form and GVN after motion 1006. The GVN technique can determine that x1 and x2 are congruent and thus t+4 can be moved outside the loop as shown in element 1006. Without the MHP analysis, the π assignment would have three arguments and GVN would not be able to establish their congruence.

Figure 11:
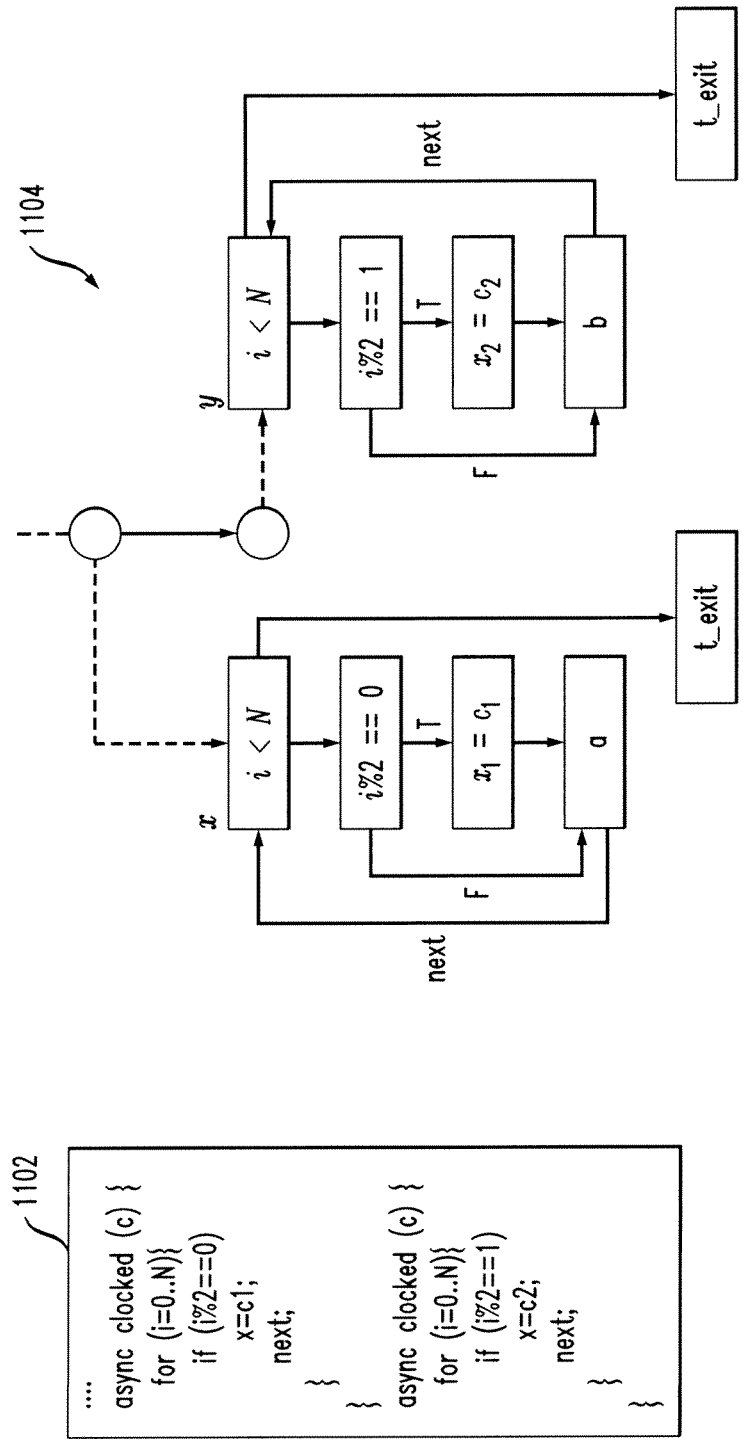
FIG. 11 is a diagram illustrating a data race example, according to an embodiment of the invention.

As noted, one or more embodiments of the invention include detection of potential data races. Consider the program fragment shown in FIG. 11. FIG. 11 is a diagram illustrating a data race example, according to an embodiment of the invention. By way of illustration, FIG. 11 depicts a program fragment 1102 and a CSSA form 1104. MHP analysis illustrates that Next(a)={y} and Next(b)={x}. Thus, the two threads have to finish each iteration together and the value of i is same in both the threads during each iteration. MHP analysis also predicts that there could be a data race between the two definitions of x. However, the code shows that this is not possible because the conditions in the "if" statements are mutually exclusive.

One way to avoid such false positives while detecting races is to tag each definition with Boolean formula φ which controls its implementation. For example, x=c1 in first thread could be tagged with φ1 and x=c2 in the other thread could be tagged φ2. Thus, the two definitions could cause a race only if the analysis says they could occur in parallel and φ1∧φ2 is satisfiable. This technique can also be used to improve precision of MHP analysis.

Figure 12:
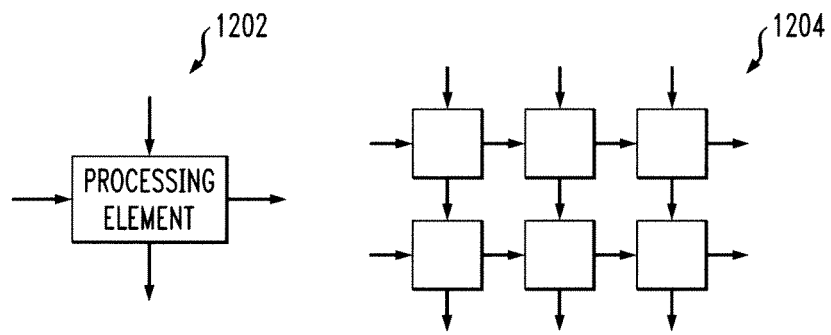
FIG. 12 is a diagram illustrating a systolic array, according to an embodiment of the invention.

One or more embodiments of the invention additionally include analysis of systolic arrays. Systolic arrays include identical processing elements connected in a regular arrangement. During each step of implementation, each element receives inputs, performs some computation, and sends the output. Systolic arrays have found applications in domains such as, for example, matrix multiplication and LU decomposition due to their ability to perform concurrent operations on large number of inputs. FIG. 12 is a diagram illustrating a systolic array, according to an embodiment of the invention. By way of illustration, FIG. 12 depicts a processing element (PE) 1202 and a two-by-three matrix of PEs 1204. Element 1202 of FIG. 12 illustrates a processing element that takes two inputs and generates two outputs and element 1204 of FIG. 12 shows a 2×3 grid of such processing elements.

Consider an example of matrix multiplication on systolic arrays. Suppose that one has two matrices A[M×N] and B[N× R] and one has to compute the product. Let C[M×R] be the product matrix. Thus, $$C[i, k] = \sum_{j=0}^{j=N-1} A[i, j] \cdot B[j, k]$$

If one has a grid of N×R elements and each element has index <j, k>, one can compute partial sum $$d[j, i, k] = \sum_{l=0}^{l=j-1} A[i, l] \cdot B[l, k]$$

at each processing element <j, k>. Thus, d[N, i, k] denotes the final value of C[i, k] and each d[j, i, k] is updated as d[j+1, i, k]=d[j, i, k]+A[i, j]*[j, k].

The variables used by each processor hj, ki can be renamed as follows:

V[j,k,i]=d[j,i,k]

H[j,k,i]=A[i,j].

Therefore, d[j+1, i, k]=d[j, i, k]+A[i, j]. B[j, k] can be written as:

V[j+1,k,i]=V[j,k,i]+H[j,k,i]*B[j,k]

Also, for all i, j, k: H[j, k+1, i]=A[i, j]=H[j, k, i].

A program fragment for matrix multiplication is provided below. The statement async i=0 . . . u−1 clocked (c){ } creates u threads with ids 0, 1, . . . , k−1 where each thread is registered with clock c.

```
async j=0..N-1 clocked(c){
    async k=0..R-1 clocked(c){
        for (i=0;i<M;i++)
            t=j*R+k;
            for (t'=0;t'<t;t'++)
                next;
            V[j+1,k,i]=V[j,k,i]+H[j,k,i]*B[j,k];
            H[j,k+1,i]=H[j,k,i];
            for(t'=t ;t'<N*R;t'++)
                next;
    }
}
```

Figure 13:
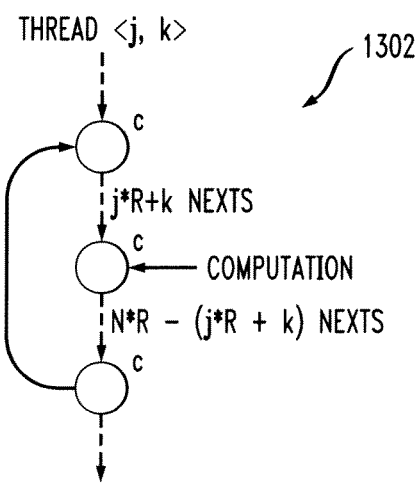
FIG. 13 is a diagram illustrating structure of a thread, according to an embodiment of the invention.

A part of clocked CFG of some thread <j, k> (in the code fragment shown above) is given in FIG. 13. FIG. 13 is a diagram illustrating structure of a thread 1302, according to an embodiment of the invention. MHP analysis reveals that all threads proceed together from one iteration of the loop to the next (due to N×R next statements in the loop body). Computation in each <j, k> belongs to (j×R+k+1)+i×N×R (for 0≤i<M−1) phases of clock c. Thus, within a single loop iteration, computations in different threads do not interfere with each other. Therefore, one can conclude that computations in different threads of the program will never interfere with each other and exactly one thread would perform computation during any given phase of the clock. Thus, correctness of concurrent programs having structure of systolic arrays can be established.

Figure 14:
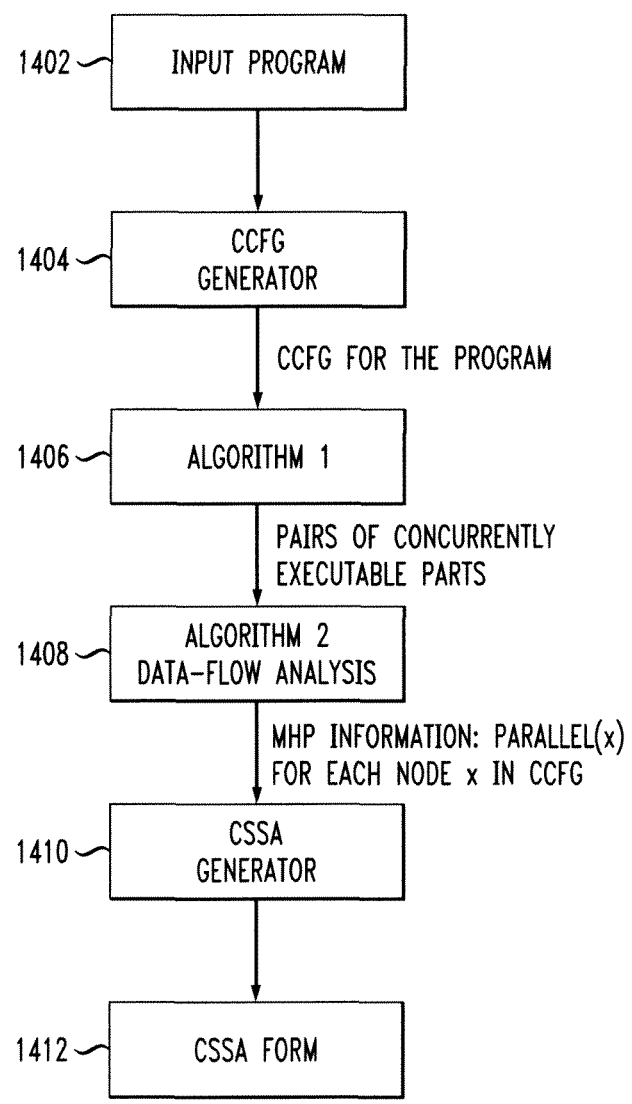
FIG. 14 is a block diagram illustrating an exemplary embodiment, according to an aspect of the invention.

FIG. 14 is a block diagram illustrating an exemplary embodiment, according to an aspect of the invention. FIG. 14 depicts an input program 1402, which is provided to a clocked control flow graph (CCFG) generator 1404, which generates the CCFG for the program. Algorithm 1 (that is, component 1406) is implemented on the CCFG for the program to generate pairs of concurrently executable parts. Also, algorithm 2 (data-flow analysis) (that is, component 1408) is implemented on the pairs of concurrently executable pairs to generate MHP information such as, for example, Parallel(x) for each node x in the CCFG, and such input is provided to a CSSA generator 1410. The CSSA generator 1410 generates the CSSA form of the program 1412.

Figure 15:
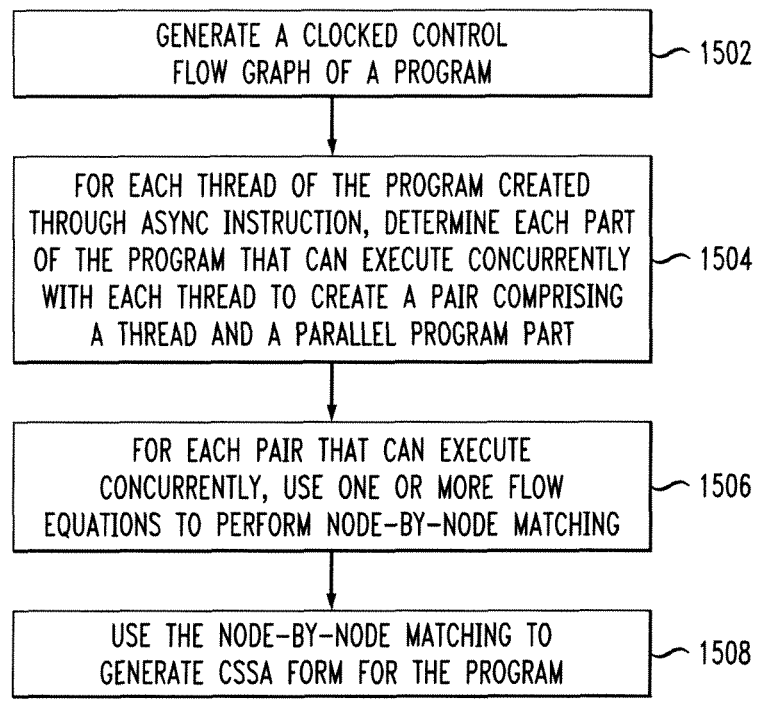
FIG. 15 is a flow diagram illustrating techniques for generating concurrent static single assignment (CSSA), according to an embodiment of the invention.

FIG. 15 is a flow diagram illustrating techniques for generating concurrent static single assignment (CSSA), according to an embodiment of the present invention. Step 1502 includes generating a clocked control flow graph of a program. Generating a clocked control flow graph of a program can include generating a clocked control flow graph for one or more general barrier operations within a program. Also, generating a clocked control flow graph for general barrier operations within a program can additionally include using clock and finish operations.

Step 1504 includes for each thread of the program created through async instruction, determining each part of the program that can execute concurrently with each thread (for example, using asynchronous parallel threads within the program) to create a pair comprising a thread and a parallel program part. For example, this can be performed as detailed in algorithm 1 in FIG. 3.

Step 1506 includes for each pair that can execute concurrently, using one or more flow equations to perform node-by-node matching. Step 1508 includes using the node-by-node matching to generate CSSA form for the program. Generating CSSA form for the program can further include improving precision of intermediate representation for computing global value numbering, as well as improving one or more optimizations such as, for example, partial redundancy elimination, common sub-expression elimination and/or loop invariant detection.

The techniques depicted in FIG. 15 also include computing May-Happen-in-Parallel (MHP) analysis for the program. Computing MHP analysis for the program can include performing node-by-node matching to compute node-level MHP information that accounts for one or more barriers (as detailed, for example, in algorithm 2 in FIG. 4).

Performing node-by-node matching can include for each node n taken from an async, using the dataflow analysis to compute a Parallel(n) set of nodes belonging to the a parallel program part such that each of one or more nodes of the parallel program part excluded from Parallel(n) either precede or succeed n in time and cannot occur in parallel with n.

Additionally, each node has attribute sets in, parallel and next that increase monotonically as dataflow analysis proceeds to reaching a fix-point once all sets stop increasing, at which point node-by-node matching halts with a parallel attribute for each node n being an answer Parallel(n) for the node.

One or more embodiments of the invention can additionally include discovering potential data races as well as analyzing systolic techniques.

The techniques depicted in FIG. 15 can also, as described herein, be run on a system, wherein the system includes distinct software modules, each of the distinct software modules being embodied on a tangible computer-readable recordable storage medium.

Additionally, the techniques depicted in FIG. 15 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 16:
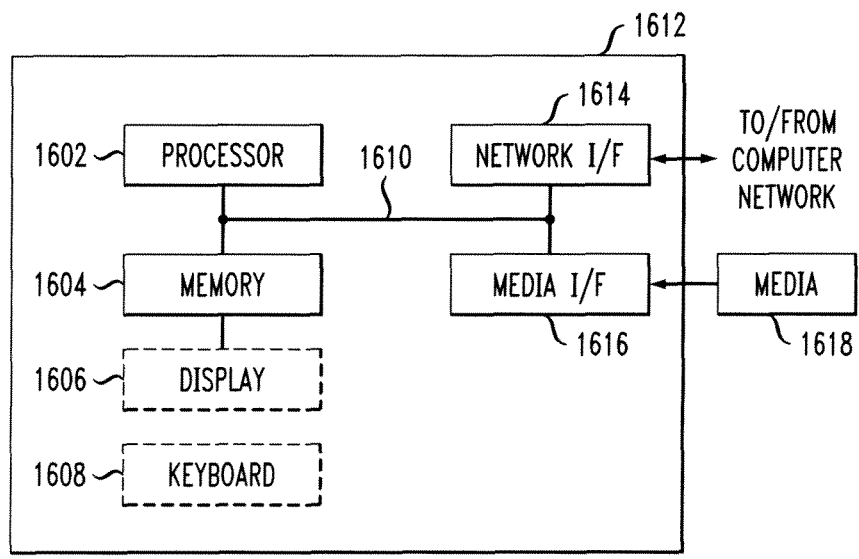
FIG. 16 is a system diagram of an exemplary computer system on which at least one embodiment of the invention can be implemented.

One or more embodiments can make use of software running on a general purpose computer or workstation. With reference to FIG. 16, such an implementation might employ, for example, a processor 1602, a memory 1604, and an input/output interface formed, for example, by a display 1606 and a keyboard 1608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 1602, memory 1604, and input/output interface such as display 1606 and keyboard 1608 can be interconnected, for example, via bus 1610 as part of a data processing unit 1612. Suitable interconnections, for example via bus 1610, can also be provided to a network interface 1614, such as a network card, which can be provided to interface with a computer network, and to a media interface 1616, such as a diskette or CD-ROM drive, which can be provided to interface with media 1618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 1618) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 1604), magnetic tape, a removable computer diskette (for example media 1618), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or implementing program code will include at least one processor 1602 coupled directly or indirectly to memory elements 1604 through a system bus 1610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1608, displays 1606, pointing devices, and the like) can be coupled to the system either directly (such as via bus 1610) or through intervening I/O controllers (omitted for clarity).

Network adapters such as network interface 1614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1612 as shown in FIG. 16) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may implement entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which implement via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which implement on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in the corresponding figures and descriptions thereof. The method steps can then be carried out using the distinct software modules and/or sub-modules of the system, as described above, executing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, improving precision of intermediate representation for computing global value numbering.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating concurrent static single assignment (CSSA), wherein the method comprises:
    generating a clocked control flow graph of a program;
    for each thread of the program created through async instruction, determining each part of the program that can execute concurrently with each thread to create a pair comprising a thread and a parallel program part;
    for each pair that can execute concurrently, using one or more flow equations to perform node-by-node matching via:
    computing a closest common ancestor for each node in the thread of the pair and a node in the parallel program part, wherein said closest common ancestor comprises a node that it is closest to both the node in the thread and the node in the parallel program part;
    generating a graph for the thread and a graph for the parallel program part of the pair, wherein the graph for the thread comprises all paths from the closest common ancestor to the node in the thread and from the node in the thread to a conclusion point, and wherein the graph for the parallel program part comprises all paths from the closest common ancestor to the node in the parallel program part and from the node in the parallel program part to a conclusion point;
    matching nodes in the graph for the thread and the graph for the parallel program part; and
    using the node-by-node matching to generate CSSA form for the program, wherein said CSSA form improves (i) precision of intermediate representation for computing global value numbering and (ii) at least one of (a) partial redundancy elimination, (b) common sub-expression elimination and (c) loop invariant detection.

2. The method of claim 1, wherein generating a clocked control flow graph of a program comprises generating a clocked control flow graph for one or more general barrier operations within a program.

3. The method of claim 2, wherein generating a clocked control flow graph for one or more general barrier operations within a program comprises using clock and finish operations.

4. The method of claim 1, further comprising computing May-Happen-in-Parallel (MHP) analysis for the program, wherein computing May-Happen-in-Parallel (MHP) analysis for the program comprises performing node-by-node matching to compute node-level MHP information that accounts for one or more barriers.

5. The method of claim 1, wherein performing node-by-node matching comprises for each node n taken from an async, using the dataflow analysis to compute a Parallel(n) set of nodes belonging to the a parallel program part such that each of one or more nodes of the parallel program part excluded from Parallel(n) either precede or succeed n in time and cannot occur in parallel with n.

6. The method of claim 1, wherein each node has attribute sets in, parallel and next that increase monotonically as dataflow analysis proceeds to reaching a fix-point once all sets stop increasing.

7. The method of claim 6, wherein when the dataflow analysis reaches a fix-point once all sets stop increasing, node-by-node matching halts with a parallel attribute for each node n being an answer Parallel(n) for the node.

8. The method of claim 1, further comprising at least one of discovering one or more potential data races and analyzing one or more systolic techniques.

9. A computer program product comprising a tangible non-transitory computer readable recordable storage device including computer useable program code for generating concurrent static single assignment (CSSA), the computer program product including:
  computer useable program code for generating a clocked control flow graph of a program;
  computer useable program code for, for each thread of the program created through async instruction, determining each part of the program that can execute concurrently with each thread to create a pair comprising a thread and a parallel program part;
  computer useable program code for, for each pair that can execute concurrently, using one or more flow equations to perform node-by-node matching via:
computing a closest common ancestor for each node in the thread of the pair and a node in the parallel program part, wherein said closest common ancestor comprises a node that it is closest to both the node in the thread and the node in the parallel program part;
  generating a graph for the thread and a graph for the parallel program part of the pair, wherein the graph for the thread comprises all paths from the closest common ancestor to the node in the thread and from the node in the thread to a conclusion point, and wherein the graph for the parallel program part comprises all paths from the closest common ancestor to the node in the parallel program part and from the node in the parallel program part to a conclusion point;
  matching nodes in the graph for the thread and the graph for the parallel program part; and
  computer useable program code for using the node-by-node matching to generate CSSA form for the program, wherein said CSSA form improves (i) precision of intermediate representation for computing global value numbering and (ii) at least one of (a) partial redundancy elimination, (b) common sub-expression elimination and (c) loop invariant detection.

10. The computer program product comprising a tangible non-transitory computer readable recordable storage device of claim 9, wherein the computer useable program code for generating a clocked control flow graph of a program comprises computer useable program code for generating a clocked control flow graph for one or more general barrier operations within a program.

11. The computer program product comprising a tangible non-transitory computer readable recordable storage device of claim 10, wherein the computer useable program code for generating a clocked control flow graph for one or more general barrier operations within a program comprises computer useable program code for using clock and finish operations.

12. The computer program product comprising a tangible non-transitory computer readable recordable storage device of claim 9, further comprising:
  computer useable program code for computing May-Happen-in-Parallel (MHP) analysis for the program, wherein the computer useable program code for computing May-Happen-in-Parallel (MHP) analysis for the program comprises computer useable program code for performing node-by-node matching to compute node-level MHP information that accounts for one or more barriers.

13. The computer program product comprising a tangible non-transitory computer readable recordable storage device of claim 9, wherein the computer useable program code for performing node-by-node matching comprises computer useable program code for, for each node n taken from an async, using the dataflow analysis to compute a Parallel(n) set of nodes belonging to the a parallel program part such that each of one or more nodes of the parallel program part excluded from Parallel(n) either precede or succeed n in time and cannot occur in parallel with n.

14. A system for generating concurrent static single assignment (CSSA), comprising:
  a memory; and
  at least one processor coupled to the memory and operative to:
  generate a clocked control flow graph of a program;
    for each thread of the program created through async instruction, determine each part of the program that can execute concurrently with each thread to create a pair comprising a thread and a parallel program part;
  for each pair that can execute concurrently, use one or more flow equations to perform node-by-node matching via:
    computing a closest common ancestor for each node in the thread of the pair and a node in the parallel program part, wherein said closest common ancestor comprises a node that it is closest to both the node in the thread and the node in the parallel program part;
    generating a graph for the thread and a graph for the parallel program part of the pair, wherein the graph for the thread comprises all paths from the closest common ancestor to the node in the thread and from the node in the thread to a conclusion point, and wherein the graph for the parallel program part comprises all paths from the closest common ancestor to the node in the parallel program part and from the node in the parallel program part to a conclusion point;
    matching nodes in the graph for the thread and the graph for the parallel program part; and
    use the node-by-node matching to generate CSSA form for the program, wherein said CSSA form improves (i) precision of intermediate representation for computing global value numbering and (ii) at least one of (a) partial redundancy elimination, (b) common sub-expression elimination and (c) loop invariant detection.

15. The system of claim 14, wherein the at least one processor coupled to the memory operative to generate a clocked control flow graph of a program is further operative to generate a clocked control flow graph for one or more general barrier operations within a program.

16. The system of claim 15, wherein the at least one processor coupled to the memory operative to generate a clocked control flow graph for one or more general barrier operations within a program is further operative to use clock and finish operations.

17. The system of claim 14, wherein the at least one processor coupled to the memory is further operative to:
compute May-Happen-in-Parallel (MHP) analysis for the program, wherein computing May-Happen-in-Parallel (MHP) analysis for the program comprises performing node-by-node matching to compute node-level MHP information that accounts for one or more barriers.

18. The system of claim 14, wherein the at least one processor coupled to the memory operative to perform node-by-node matching is further operative to for each node n taken from an async, use the dataflow analysis to compute a Parallel (n) set of nodes belonging to the a parallel program part such that each of one or more nodes of the parallel program part excluded from Parallel(n) either precede or succeed n in time and cannot occur in parallel with n.

* * * * *